US007673138B2

(12) United States Patent
Hosokawa et al.

(10) Patent No.: US 7,673,138 B2
(45) Date of Patent: Mar. 2, 2010

(54) METHOD, PROGRAM, AND COMPUTER SYSTEM FOR SWITCHING FOLDER TO BE ACCESSED BASED ON CONFIDENTIAL MODE

(75) Inventors: Masahiro Hosokawa, Tokyo (JP); Kazuo Yanoo, Tokyo (JP)

(73) Assignee: NEC Corporation, Tokyo (JP)

( * ) Notice: Subject to any disclaimer, the term of this patent is extended or adjusted under 35 U.S.C. 154(b) by 1163 days.

(21) Appl. No.: 11/257,124

(22) Filed: Oct. 25, 2005

(65) Prior Publication Data

US 2006/0095762 A1    May 4, 2006

(30) Foreign Application Priority Data

Oct. 28, 2004  (JP) ............................ 2004-314070

(51) Int. Cl.
  *H04L 29/06* (2006.01)
(52) U.S. Cl. ..................................... 713/164
(58) Field of Classification Search ................ 713/164, 713/165, 166
  See application file for complete search history.

(56) References Cited

U.S. PATENT DOCUMENTS

| | | | | |
|---|---|---|---|---|
| 5,530,758 A * | 6/1996 | Marino et al. ............... 713/150 |
| 5,845,280 A * | 12/1998 | Treadwell et al. .............. 707/8 |
| 5,953,419 A * | 9/1999 | Lohstroh et al. ............ 713/165 |
| 6,301,567 B1 * | 10/2001 | Leong et al. ................. 705/33 |
| 6,463,465 B1 * | 10/2002 | Nieuwejaar ................. 709/217 |
| 6,654,864 B2 * | 11/2003 | Shaath et al. ............... 711/163 |
| 6,711,572 B2 * | 3/2004 | Zakharov et al. ............... 707/10 |
| 6,745,306 B1 * | 6/2004 | Willman et al. ............. 711/163 |
| 6,851,056 B2 * | 2/2005 | Evans et al. .................. 713/193 |
| 7,178,033 B1 * | 2/2007 | Garcia ......................... 713/184 |
| 7,188,086 B2 * | 3/2007 | Shinzaki et al. ............... 705/51 |
| 7,200,860 B2 * | 4/2007 | Ghaffar ......................... 726/2 |
| 7,350,204 B2 * | 3/2008 | Lambert et al. ............. 717/172 |
| 2003/0004881 A1 * | 1/2003 | Shinzaki et al. ............... 705/51 |
| 2004/0003289 A1 * | 1/2004 | Bhogal et al. ............... 713/201 |
| 2004/0054674 A1 * | 3/2004 | Carpenter et al. .............. 707/9 |
| 2006/0047899 A1 * | 3/2006 | Ilda et al. ..................... 711/113 |
| 2006/0212945 A1 * | 9/2006 | Donlin et al. ................. 726/29 |

FOREIGN PATENT DOCUMENTS

JP      05-181734 A      7/1993
JP      08-249238 A      9/1996

(Continued)

*Primary Examiner*—David Garcia Cervetti
(74) *Attorney, Agent, or Firm*—Sughrue Mion, PLLC

(57) ABSTRACT

There is disclosed a method for switching access folders in accordance with a confidential mode. In this method, a confidential root directory is located below a normal root directory. A directory structure constituted by the at least one confidential folder other than a confidential root directory is the same as that constituted by at least one normal folder other than a normal root directory. A file access request from an application program to a disk device is received. If the application program is operating as a process in a confidential mode, file access to the confidential file in the confidential folder is executed through a kernel, by rewriting a specified file path name with a file path name corresponding to the confidential folder below the confidential root directory. If the application program is operating as a process in the normal mode, file access to the confidential file in the confidential folder is not permitted.

27 Claims, 5 Drawing Sheets

FOREIGN PATENT DOCUMENTS

| | | |
|---|---|---|
| JP | 08-255132 A | 10/1996 |
| JP | 10-312335 A | 11/1998 |
| JP | 2001-350663 A | 12/2001 |
| JP | 2002-092221 A | 3/2002 |
| JP | 2002-288030 A | 10/2002 |
| JP | 2004-126634 A | 4/2004 |

* cited by examiner

METHOD, PROGRAM, AND COMPUTER SYSTEM FOR SWITCHING FOLDER TO BE ACCESSED BASED ON CONFIDENTIAL MODE

BACKGROUND OF THE INVENTION

1. Field of the Invention

The present invention relates to a method, program, and computer system for switching a folder to be accessed based on a confidential mode, and more particularly to a file access control scheme according to security levels.

2. Description of the Related Art

A scheme of strengthening access control of files or the like in a computer has been known in a conventional file access control method. In this scheme, security levels of "confidential" and "normal" are assigned in advance to an access target (object) such as a file and an access subject (subject) such as a user process, respectively. Accessibility from the subject to the object is determined by comparing the security levels of both the subject and object. This scheme is generally called "multi-level security (MLS)".

The concept of this MLS has been practically introduced as mandatory access control (MAC) into various kinds of "trusted OSs" which have been spotlighted, for example, as OS (Operating System) having a strengthened security function. Under this mandatory access control, a user process cannot perform writing into a file of a lower security level than the user process (this is called an "NWD principle: No Write-Down Principle") and, inversely, cannot read a file of a higher security level than the user process (this is called an "NRU principle: No Read-Up Principle"). In this manner, information of a high security level is strictly prevented from being transferred to a user at an only low security level. In place of the NWD principle, a principle that a user process can perform only writing at the same security level as the user process itself is still often used. As a result, upgrade to an unintended security level can be prevented although flexibility is sacrificed.

With respect to a scheme of implementing the file access control according to security levels as described above, there have been two known implementation schemes as follows.

(First Conventional Technique)

In one of the known schemes, each file is provided with attribute information concerning a security level. At the time of I/O (inputting/outputting) of a file, the attribute information is compared with the security level of the currently running process. As a result, if access does not satisfy the NWD principle or NRU principle, the access to the file is blocked. This is carried out using a dedicated file system created specially. If a file having a lower security level than a security level of a process is accessed, the security level of the file is raised up to the same security level as that of the process.

(Second Conventional Technique)

Another one of the schemes is implemented in Trusted Solaris (commercial name) manufactured by SUN MICROSYSTEMS, INC. In this scheme, two kinds of special directories, i.e., a multi-level directory (MLD) and a single-level direction (SLD) are included to correspond to confidential modes. The MLD is a special directory which allows plural SLDs to be located directly below it. The SLD is a special directory which corresponds to a particular security level by one-to-one. By combining these special directories, directories observable from a user can be matched with the security level of the user.

Conventional-art documents relating to the above schemes include the following: JP-A-2002-288030, JP-A-2004-126634, JP-A-1996-249238, and JP-A-1998-312335.

As described above, a technique (first conventional technique) of managing files by providing each file with an attribute concerning a security level, and another technique (second conventional technique) of arranging directories divided into security levels have been known as conventional art which practices the MLS. Each of these techniques adopts a method of enhancing an existing file system. The following problems have hence arisen.

A first problem is that the user finds difficulties in working by operating processes simultaneously in a normal mode and confidential mode in one application (AP). This is because, if both APs output the same temporary file in the first conventional technique, security levels conflict each other, and therefore, the applications cannot coexist simultaneously. This causes a limitation to operation of AP.

A second problem is that different configuration files inevitably have to be used in the normal mode and confidential mode. The user hence is confused by differences in setting between the modes of the operation environment. This is because, in the first conventional technique, if a configuration file is updated in the confidential mode, the security level of the file is raised and cannot be read from a process of the normal level. On the other side, in the second conventional technique, directories in which configuration files are to be located are located in different single level directories.

A third problem is that there is no compatibility with existing file systems. It is therefore difficult to implant an application created based on a presumption of presence of access-right management managed by an existing file system. This is because the file system is enhanced by providing each file with enhanced attribute information or by providing a unique directory attribute.

SUMMARY OF THE INVENTION

An object of the present invention is to allow a user to work while operating processes simultaneously in a normal mode and confidential mode with respect to one application in a file access control scheme based on security levels.

Another object of the present invention is to overcome a situation that a difference in setting between modes of the operation environment confuses the user.

Further, another object of the present invention is to have ability to operate in an application created on the basis of a presumption of presence of access right management managed by an existing file system.

To achieve the above objects, in the present invention, a process capable of dealing with confidential information and a process incapable of dealing with confidential information are separated from each other. An accessible folder is constructed only from the process capable of dealing with confidential information. Confidential information files are hidden from a normal process. In addition, transparent access to both of confidential information and non-confidential information is enabled from a process in which confidential information is dealt with. For example, if a file access request is issued from an arbitrary application program and if the application program is a confidential process, the path of a file to which access is requested is replaced by a file-path rewrite function with a file name below a predetermined confidential folder, and this is informed to the kernel. Otherwise, if the application program is a normal process incapable of dealing with a confidential file, an access folder is switched so as to prevent file access to a file below the confidential folder. As a result of this, file access corresponding to a security level can be mandatorily executed with use of an existing file system.

The present invention has been accomplished on the basis of conception as described above.

According to the present invention, there is provided a method for switching a folder to be accessed based on a confidential mode for use in a computer. The computer executes a kernel and an application program as a process. The kernel has a file system for controlling file access of a disk device. The application program executes file access to the disk device via the file system. The method comprises: a step of setting a directory structure in the disk device such that: a confidential root directory is located below a normal root directory; at least one normal folder is hierarchically located below the normal root directory and is configured to store a normal file constituted by non-confidential information; at least one confidential folder is hierarchically located below the confidential root directory and is configured to store a confidential file constituted by confidential information; and a directory structure constituted by the at least one confidential folder other than the confidential root directory is the same as that constituted by the at least one normal folder other than the normal root directory; a step of, when the application program is started up by the computer, specifying a function level expressing whether the application program should be operated as a process in a confidential mode capable of dealing with the confidential file or as a process in a normal mode incapable of dealing with the confidential file; a step of, when a file access request for file access to the disk device with a specified file path name is received from the application program, determining whether the application program is operating as the process in the confidential mode or as the process in the normal mode, based on the function level specified; a step of, if the application program is operating as the process in the confidential mode, rewriting the specified file path name with a file path name corresponding to the confidential folder below the confidential root directory, and of allowing file access to the confidential file in the confidential folder specified by the file path name to be executed via the kernel; and a step of, if the application program is operating as the process in the normal mode, not permitting the file access to the confidential file in the confidential folder.

According to the present invention, there is provided a program for causing a computer to perform a method for switching a folder to be accessed based on a confidential mode. The computer executes a kernel and an application program as a process. The kernel has a file system for controlling file access of a disk device. The application program executing file access to the disk device via the file system. The method comprises: a step of setting a directory structure in the disk device such that: a confidential root directory is located below a normal root directory; at least one normal folder is hierarchically located below the normal root directory and is configured to store a normal file constituted by non-confidential information; at least one confidential folder is hierarchically located below the confidential root directory and is configured to store a confidential file constituted by confidential information; and a directory structure constituted by the at least one confidential folder other than the confidential root directory is the same as that constituted by the at least one normal folder other than the normal root directory; a step of, when the application program is started up by the computer, specifying a function level expressing whether the application program should be operated as a process in a confidential mode capable of dealing with the confidential file or as a process in a normal mode incapable of dealing with the confidential file; a step of, when a file access request for file access to the disk device with a specified file path name is received from the application program, determining whether the application program is operating as the process in the confidential mode or as the process in the normal mode, based on the function level specified; a step of, if the application program is operating as the process in the confidential mode, rewriting the specified file path name with a file path name corresponding to the confidential folder below the confidential root directory, and of allowing file access to the confidential file in the confidential folder specified by the file path name to be executed via the kernel; and a step of, if the application program is operating as the process in the normal mode, not permitting the file access to the confidential file in the confidential folder.

According to the present invention, there is provided a computer system for switching a folder to be accessed based on a confidential mode. The computer system executes a kernel and an application program as a process. The kernel has a file system for controlling file access of a disk device. The application program executes file access to the disk device via the file system. The computer system comprises: means for setting a directory structure in the disk device such that: a confidential root directory is located below a normal root directory; at least one normal folder is hierarchically located below the normal root directory and is configured to store a normal file constituted by non-confidential information; at least one confidential folder is hierarchically located below the confidential root directory and is configured to store a confidential file constituted by confidential information; and a directory structure constituted by the at least one confidential folder other than the confidential root directory is the same as that constituted by the at least one normal folder other than the normal root directory; means for, when the application program is started up by the computer, specifying a function level expressing whether the application program should be operated as a process in a confidential mode capable of dealing with the confidential file or as a process in a normal mode incapable of dealing with the confidential file; means for, when a file access request for file access to the disk device with a specified file path name is received from the application program, determining whether the application program is operating as the process in the confidential mode or as the process in the normal mode, based on the function level specified; means for, if the application program is operating as the process in the confidential mode, rewriting the specified file path name with a file path name corresponding to the confidential folder below the confidential root directory, and of allowing file access to the confidential file in the confidential folder specified by the file path name to be executed via the kernel; and means for, if the application program is operating as the process in the normal mode, not permitting the file access to the confidential file in the confidential folder.

According to the present invention, file access according to security levels can be mandatorily executed with use of an existing file system. Therefore, users can work while operating processes simultaneously in both the normal mode and the confidential mode. In addition, it is possible to overcome a situation that users are confused by differences in settings between modes of the operation environment. Further, even an application program created on the presumption of presence of access right management managed by an existing file system can operate without change.

DETAILED DESCRIPTION OF THE PREFERRED EMBODIMENTS

Referring to the accompanying drawings, preferred embodiments of a method, program, and computer system for switching a folder to be accessed based on security levels according to the present invention, will be now described in detail in terms of their best modes.

First Embodiment

Figure 1:
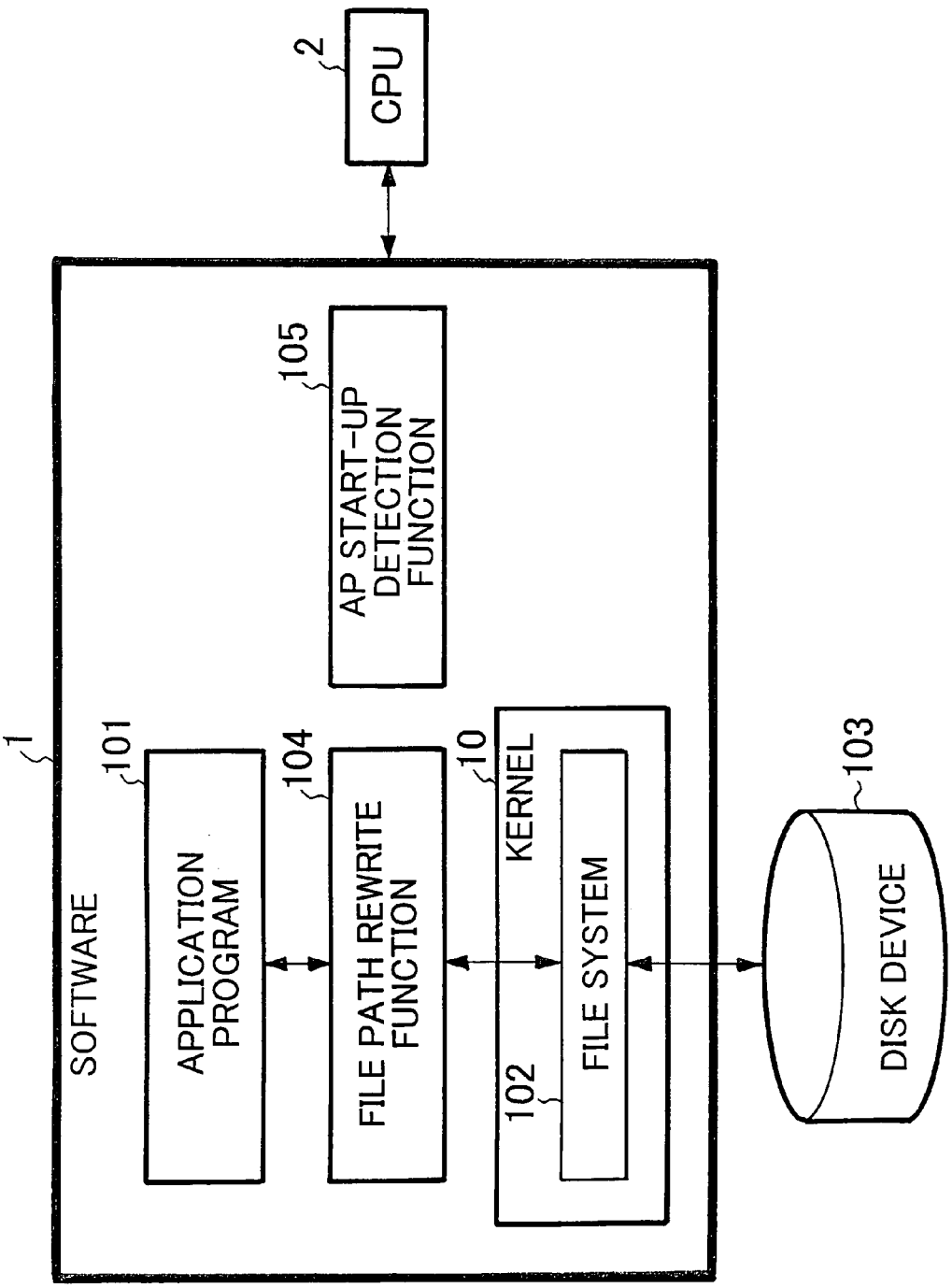
FIG. 1 is a diagram showing the entire structure of a computer system according to a first embodiment of the present invention.

FIG. 1 is a diagram showing the entire structure of a computer system according to the present embodiment.

Referring to FIG. 1, the computer system according to the present embodiment includes: a CPU (Central Processing Unit) 2 which executes preset software (program) 1 to realize the function of the software 1; and a disk device 103 such as a hard disk drive device which is electrically connected to the CPU 2 via a bus (although other input/output (I/O) devices than the disk device 103 are omitted from the example shown in FIG. 1).

The software 1 includes: an application program (hereinafter referred to simply as an "application") 101; a kernel 10 having a file system 102 which controls various file accesses to the disk device 103; and further, in the present embodiment, a file-path rewrite function 104 and an AP (application) start-up detection function 105. The application 101 and the kernel 10 having the file system 102, which are used herein, are those provided by an ordinary computer and the OS thereof. Therefore, the structure and details of the function thereof will be omitted. The file-path rewrite function 104 and the AP start-up detection function 105 constitute main parts of respective processing steps in the method and program for switching a folder to be accessed, as well as main parts of respective means of the computer system according to the present invention. These functions 104 and 105 along with the kernel 10 and application 101 are installed as control programs executed by the CPU 2.

The file-path rewrite function 104 is implemented, for example, as a dynamic link library (DLL). This function 104 is read out and becomes able to work when a system call related to file access to the disk device 103 is called from the application 101.

The AP start-up detection function 105 functions to monitor start-up of the application 101, and to replace a function pointer of the application 101 so as to call the file-path rewrite function 104 at the time of file access, when an arbitrary application 101 is started up.

Next, operation of the present embodiment will be described specifically with reference to FIGS. 1 to 3.

Figure 2:
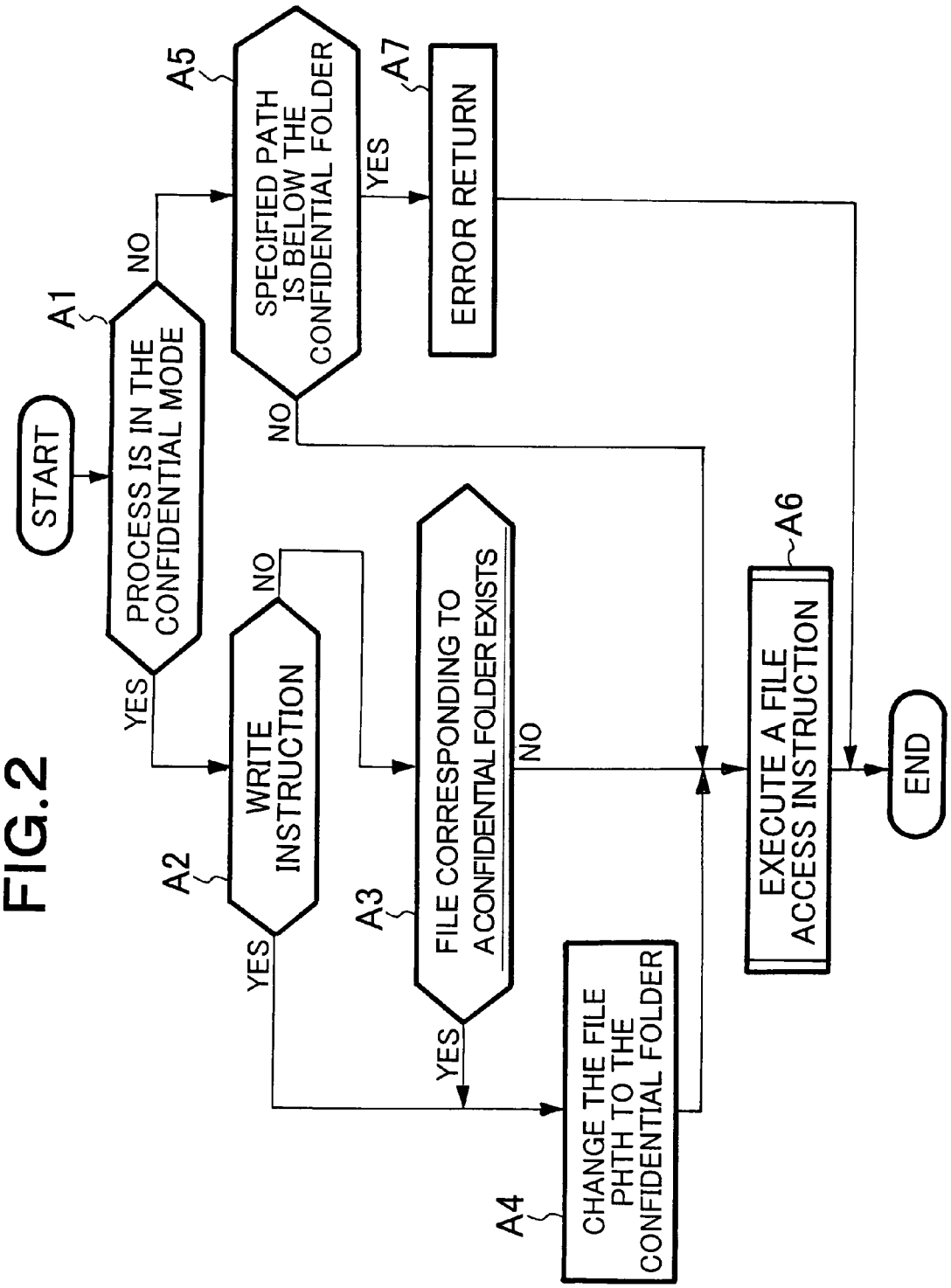
FIG. 2 is a flowchart explaining operation of a file-path rewrite function shown in FIG. 1.

FIG. 2 is a flowchart showing operation of the file-path rewrite function. FIG. 3 shows the directory structure in the disk device 103.

Figure 3:
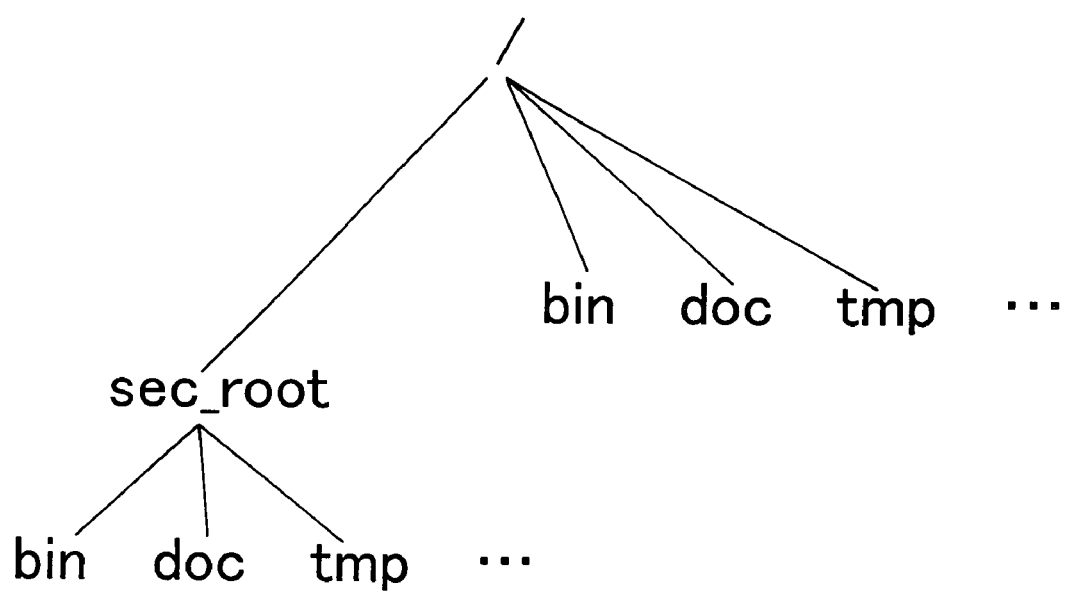
FIG. 3 is a tree view explaining the directory structure in a disk device.

At first, as shown in FIG. 3, a path to a confidential folder for writing a confidential file as confidential information is defined in advance, below a confidential root directory "sec_root" as the directory structure in the disk device 103. The confidential root directory "sec_root" is located below a normal root directory "/". The directory structure of directories "bin", "doc", "tmp", etc. below the confidential root directory "sec_root" is set in the same directory structure as that of normal folders "bin", "doc", "tmp", etc. for writing normal files as non-confidential information below the normal root directory.

Next, when starting up the application 101, the user specifies in advance whether the process is started up as a process of a confidential mode capable of dealing with confidential information or as a process of a normal mode incapable of dealing with confidential information. This specification of a security level is transferred to the file-path rewrite function 104 by setting it, for example, as an environment variable.

Next, the AP start-up detection function 105 detects start-up of the arbitrary application 101 and rewrites the function pointer of the system call in file access by the application 101. Thus, a function corresponding to the file-path rewrite function 104 is called when a file is accessed.

Next, the file-path rewrite function 104 performs the following processing (see FIG. 2), based on the confidential mode of the process, the path to the file to which access is being requested, and the contents of the access request, which are transferred from the application 101.

As shown in FIG. 2, the file-path rewrite function 104 firstly determines whether the process is in the confidential mode or not (step A1). As a result, if the process is in the confidential mode (YES), the file-path rewrite function 104 determines whether the file access request is a write instruction or not (step A2).

As a result, if the request is the write instruction (YES), the file path is rewritten (step A4). At this time, it is rewritten by a relative path to "/sec_root" regarded as a root directory by adding "/sec_root" to the head of the file name written as a full path. For example, if a given file is a path file name of "/doc/file1", the file name in this case is replaced with a path name of "/sec_root/doc/file1" by rewriting this file path name. Next, a write instruction is executed with respect to this path name (step A6).

On the other side, if the file access request is other than the write instruction in step A2. (NO), e.g., if the request is a read instruction, whether or not a file exists at the path defined by adding "/sec_root" to the head of the given file path (step A3). As a result, if a file exists, the file path name is rewritten like in the case of a write instruction (step A4). If not, rewriting is not carried out. Next, a read instruction is executed with respect to this path name (step A6).

Also in step A1, if the process is in the normal mode, whether a given file path is a file name below "/sec_root" or not is confirmed (step A5). As a result, if the given file path is a file below "/sec_root", an error indicative of being inaccessible is returned (step A7). If the given file path is other than "/sec_root", a file access instruction is executed as usual (step A6).

Therefore, the following advantages can be attained, according to the present embodiment.

A first advantage is that a folder to access is switched corresponding to the confidential mode, and the process in the normal mode can be prevented from accessing a file in the confidential folder and from writing out a file into any other folder than the confidential folder. This is because every file that is written out by a process in the confidential mode is located below the confidential folder by rewriting a file path. This is also because an error is returned with respect to access to files below the confidential folder from a process in the normal mode.

A second advantage is that it can refer to files using one identical file name common to the confidential mode and the normal mode transparently. This is because the structure is arranged so as to be able to have, below a confidential folder, such a directory structure that corresponds to the all directory structure below a normal root. In addition, an application program can access files by specifying the same file name in both the confidential mode and the normal mode since rewriting of paths is carried out. In this manner, temporary files having the same name can be located in different directories in both the confidential mode and the normal mode, unconsciously from the application program. Accordingly, it is possible to solve the problem of conflict of security levels of temporary files in case where processes in the confidential mode and the normal mode are operated simultaneously.

A third advantage is that, even if a process in the confidential mode reads in and writes out a normal file, the original file remains as a normal file and is accessible from another application program in the normal mode.

A fourth advantage is that an existing file system is not changed. This is because access control based on the confidential mode is not performed by extension of the file system in the kernel but is realized by rewriting file paths in an upper level. Therefore, an existing file system can be utilized.

In the present embodiment, both of reading and writing into the confidential folder are inhibited in the normal mode. However, the structure may be arranged such that the NWD principle described previously is applied so strictly that writing into the confidential folder is permitted.

Also, in the present embodiment, all the files outputted from the application 101 in the confidential mode are outputted into the confidential folder. However, the structure may be arranged such that the file-path rewrite function 104 has a list of exceptional files which can be outputted to a normal folder, for every application 101. In this case, a path to a configuration file (which does not include confidential information) specific to an application may be written in advance as an exceptional file into the exceptional file list. Then, even if settings are changed by a user in a process in the confidential mode, writing into a folder on a normal file path is enabled without raising the security level of this configuration file. Accordingly, a common configuration file can be continuously used both in the normal mode and the confidential mode.

Second Embodiment

Figure 4:
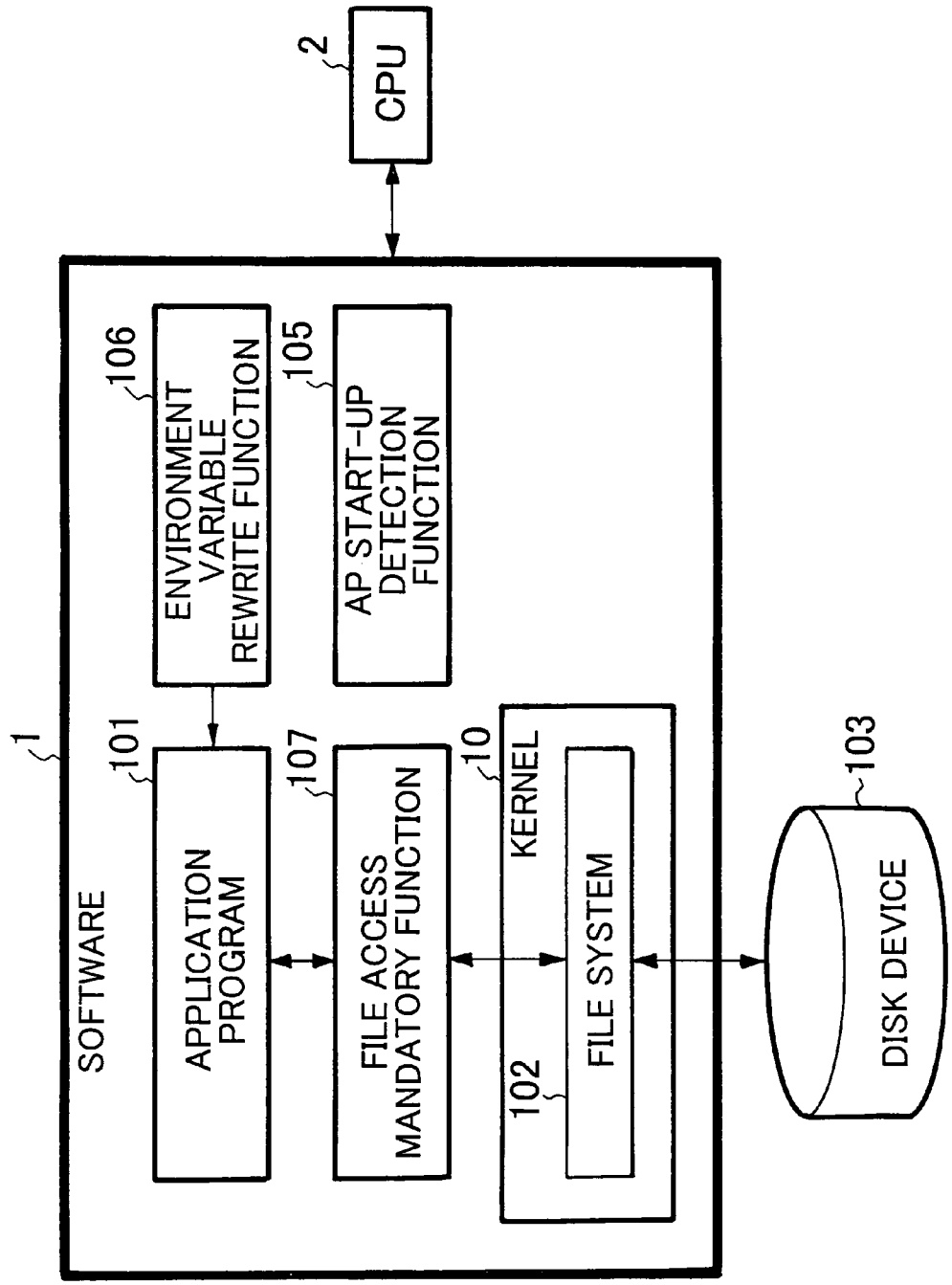
FIG. 4 is a diagram showing the entire structure of a computer system according to a second embodiment of the present invention.

FIG. 4 is a diagram showing the entire structure of the computer system according to the present embodiment.

In the first embodiment described above, input/output of files in the confidential mode is transparently replaced with a confidential root directory "sec_root" by the file-path rewrite function 104 (FIG. 1). However, in the present embodiment, a function similar to the file-path rewrite function 104 is realized by an environment variable rewrite function 106 and a file access mandatory function 107, as shown in FIG. 4. The other points of the structure are the same as those of the embodiment 1. Therefore, a description thereof will be omitted herefrom.

The AP start-up detection function 105 functions to monitor start-up of the application 101 and to call the environment variable rewrite function 106 and the file access mandatory function 107 when an arbitrary application 101 is started up.

The environment variable rewrite function 106 is implemented, for example, as a dynamic link library (DLL) and is called when the application 101 calls a system call to attain the operation environment of the program, such as environment variables, registry, and the like.

If a process operates in the confidential mode, this environment variable rewrite function 106 performs rewriting as if an environment variable specifying a temporary directory or a value of a registry specifying a cache folder were located below "/sec_root". For example, an environment variable TEMP specifying a temporary directory is set as "/tmp", rewriting is performed in the confidential mode as if this variable were set as "/sec_root/tmp".

The file access mandatory function 107 is implemented, for example, as a dynamic link library, and is called when the application 101 calls a system call for a file operation. This file access mandatory function 107 has an exceptional file list (described previously) of files which can be outputted to a normal folder, for every application 101.

Figure 5:
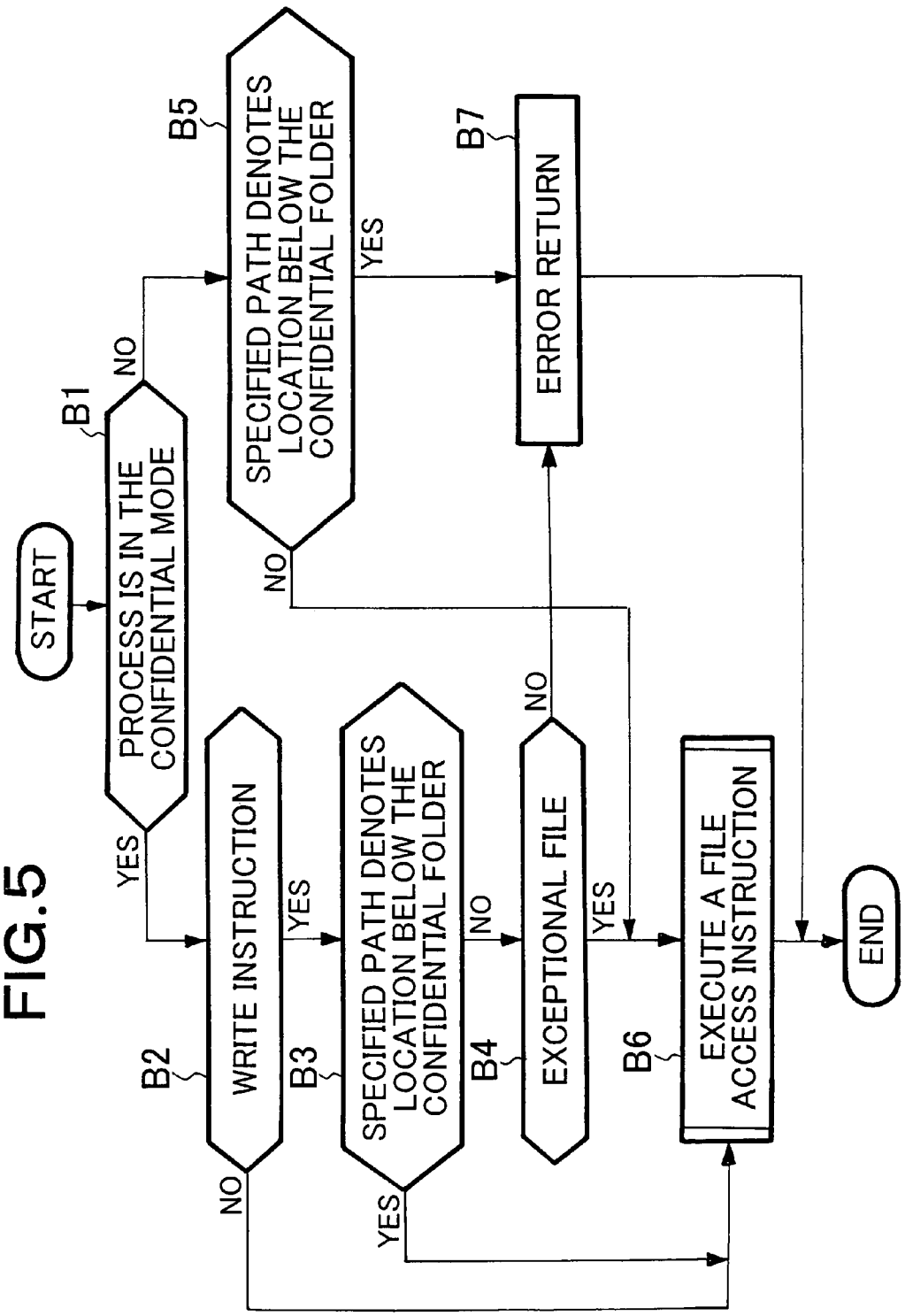
FIG. 5 is a flowchart explaining operation of a file access mandatory function shown in FIG. 4.

Next, operation of the file access mandatory function 107 will be described with reference to FIG. 5.

At first, whether a process is in the confidential mode or not is determined (step B1). If the process is in the confidential mode (YES), whether a file access request is a write instruction or not is determined subsequently (step B2). As a result, if the request is a write instruction (YES), whether or not a specified path denotes a location below the confidential folder is checked, i.e., whether a given file path is a file name below "/sec_root" or not is checked (step B3). If the file path denotes a file below "/sec_root", i.e., if the file path denotes a location below the confidential folder (YES), writing is permitted. If the file path denotes another file than those below "/sec_root", i.e., if the file path does not denote a location below the confidential folder (NO), whether or not the file path denotes an exceptional file is checked (step B4). If the file path denotes an exceptional file (YES), access to the file is permitted. Otherwise (NO), an error indicative of being inaccessible is returned (step B7).

Also in step B1, if the process is not in the confidential mode, i.e., if the process is in the normal mode (NO), whether or not the specified path denotes a confidential file below the confidential folder is checked, i.e., whether or not a given file path is a file name below "/sec_root" is checked (step B5). As a result, if the file path is a file name below "/sec_root" (YES), an error indicative of being inaccessible is returned (step B7). Otherwise, if the file path is a file name other than file names below "/sec_root" (NO), a file access instruction as used normally is executed (step B6).

Thus, in the present embodiment, confidential files can be stored only at location below "/sec_root". Therefore, files which are different from each other between the confidential mode and the normal mode are not observed as the same file. Accordingly, ordinary users can more easily understand operations. In addition, files which the environment variable rewrite function 106 temporarily writes are written below the confidential folder. Therefore, when an application 101 which operates in the confidential mode is going to write out a file as a normal file, this writing is blocked so that erroneous operation is prevented.

In the present embodiment, both of reading and writing into the confidential folder are also inhibited in the normal mode. However, the NWD principle described previously may be applied strictly so that writing into the confidential folder is permitted.

The present invention is applicable to use as a program which prevents leakage of confidential information from a general computer.

What is claimed is:

1. A method for switching a folder to be accessed based on a confidential mode for use in a computer, said computer executing a kernel and an application program as a process, said kernel having a file system for controlling file access of a disk device, said application program executing file access to the disk device via the file system, the process comprising a plurality of processes including a process in a confidential mode and a process in a normal mode, both of which are different in security level from each other, the computer maintaining security by restricting communication among the plurality of processes based on the security level, said method comprising:

setting a directory structure in the disk device such that:
a confidential root directory is located below a normal root directory;

at least one normal folder is located below the normal root directory with a directory structure and is configured to store a normal file comprising non-confidential information;

at least one confidential folder is located below the confidential root directory with a directory structure and is configured to store a confidential file comprising confidential information; and a directory structure comprising the at least one confidential folder other than the confidential root directory is the same as that comprising the at least one normal folder other than the normal root directory;

specifying a security level expressing whether the application program should be operated as a process in a confidential mode capable of accessing the confidential file or as a process in a normal mode incapable of accessing the confidential file when the application program is started up by the computer;

determining whether the application program is operating as the process in the confidential mode or as the process in the normal mode based on the security level specified when a file access request for file access to the disk device with a specified file path name is received from the application program;

rewriting the specified file path name with a file path name of the confidential folder below the confidential root directory and allowing file access to the confidential file specified by the file path name to be executed via the kernel when the application program is operating as the process in the confidential mode; and not permitting file access to the confidential file in the confidential folder when the application program is operating as the process in the normal mode.

2. The method according to claim 1, wherein said rewriting the specified file path name comprises rewriting the specified file path name with a file path name of the confidential folder below the confidential root directory by adding the confidential root directory name to a head of the specified file path name when the application program is operating as the process in the confidential mode.

3. The method according to claim 1, wherein said rewriting the specified file path name comprises:

determining whether the file access request is a write instruction;

allowing writing into the confidential file in the confidential folder to be executed through the kernel when the file access request is the write instruction;

determining whether a file corresponding to the file path name written by adding the confidential root directory name to a head of the specified file path name exists when the file access request is not the write instruction;

rewriting the specified file path name with the file path name corresponding to the confidential folder below the confidential root directory by adding the confidential root directory name to a head of the specified file path name, and allowing file access other than writing into the confidential file in the confidential folder specified by the file path name to be executed via the kernel when the file exists; and allowing read access to the normal file in the normal folder corresponding to the specified file path name to be executed via the kernel when the file does not exist.

4. The method according to claim 1, wherein said rewriting the specified file path name comprises:

maintaining a list of exceptional files which can be output to the normal folder for each application program and setting in advance a path name of a configuration file specific to the application program as the exceptional file maintained in the list when the application program is operating as the process in the confidential mode; and allowing file access to the configuration file corresponding to the exceptional file in the normal folder to be executed via the kernel based on the path name of the configuration file in the list when the confidential file is the exceptional file.

5. A method for switching a folder to be accessed based on a confidential mode for use in a computer, said computer executing a kernel and an application program as a process, said kernel having a file system for controlling file access of a disk device, said application program executing file access to the disk device via the file system, the process comprising a plurality of processes including a process in a confidential mode and a process in a normal mode, both of which are different in security level from each other, the computer maintaining security by restricting communication among the plurality of processes based on the security level, said method comprising:

setting a directory structure in the disk device such that:

a confidential root directory is located below a normal root directory;

at least one normal folder is located below the normal root directory with a directory structure and is configured to store a normal file comprising non-confidential information;

at least one confidential folder is located below the confidential root directory with a directory structure and is configured to store a confidential file comprising confidential information; and a directory structure comprising the at least one confidential folder other than the confidential root directory is the same as that comprising the at least one normal folder other than the normal root directory;

specifying a security level expressing whether the application program should be operated as a process in a confidential mode capable of accessing the confidential file or as a process in a normal mode incapable of accessing the confidential file when the application program is started up by the computer;

determining whether the application program is operating as the process in the confidential mode or as the process in the normal mode based on the security level specified when a file access request for file access to the disk device with a specified file path name is received from the application program;

allowing file access to a confidential file in the confidential folder to be executed via the kernel when the application program is operating as a process in the confidential mode and the specified file path name is a file path name of the confidential folder below the confidential root directory; and not permitting file access to the confidential file in the confidential folder when the application program is operating as the process in the normal mode.

6. The method according to claim 5, wherein said allowing file access to a confidential file comprises:

maintaining a list of exceptional files which can be output to the normal folder for each application program and setting in advance a path name of a configuration file specific to the application program as the exceptional file maintained in the list when the application program is operating as the process in the confidential mode; and allowing file access to the configuration file corresponding to the exceptional file in the normal folder to be executed via the kernel when a file denoted by the specified file path name corresponds to the exceptional file.

7. A computer-readable medium having stored therein a program for causing a computer to perform a method for switching a folder to be accessed based on a confidential mode, said computer executing a kernel and an application program as a process, said kernel having a file system for controlling file access of a disk device, said application program executing file access to the disk device via the file system, the process comprising a plurality of processes including a process in a confidential mode and a process in a normal mode, both of which are different in security level from each other, the computer maintaining security by restricting communication among the plurality of processes based on the security level, said method comprising:

setting a directory structure in the disk device such that:
a confidential root directory is located below a normal root directory;
at least one normal folder is located below the normal root directory with a directory structure and is configured to store a normal file comprising non-confidential information;
at least one confidential folder is located below the confidential root directory with a directory structure and is configured to store a confidential file comprising confidential information; and
a directory structure comprising the at least one confidential folder other than the confidential root directory is the same as that comprising the at least one normal folder other than the normal root directory;
specifying a security level expressing whether the application program should be operated as a process in a confidential mode capable of accessing the confidential file or as a process in a normal mode incapable of accessing the confidential file when the application program is started up by the computer;
determining whether the application program is operating as the process in the confidential mode or as the process in the normal mode based on the security level specified when a file access request for file access to the disk device with a specified file path name is received from the application program;
rewriting the specified file path name with a file path name of the confidential folder below the confidential root directory and allowing file access to the confidential file specified by the file path name to be executed via the kernel when the application program is operating as the process in the confidential mode; and not permitting file access to the confidential file in the confidential folder when the application program is operating as the process in the normal mode.

8. The computer-readable medium having stored therein a program according to claim 7, wherein said rewriting the specified file path name comprises rewriting the specified file path name with a file path name of the confidential folder below the confidential root directory by adding the confidential root directory name to a head of the specified file path name when the application program is operating as the process in the confidential mode.

9. The computer-readable medium having stored therein a program according to claim 7, wherein said rewriting the specified file path name comprises:
determining whether the file access request is a write instruction;
allowing writing into the confidential file in the confidential folder to be executed through the kernel when the file access request is the write instruction;
determining whether a file corresponding to the file path name written by adding the confidential root directory name to a head of the specified file path name exists when the file access request is not the write instruction;
rewriting the specified file path name with the file path name corresponding to the confidential folder below the confidential root directory by adding the confidential root directory name to a head of the specified file path name, and allowing file access other than writing into the confidential file in the confidential folder specified by the file path name to be executed via the kernel when the file exists; and
allowing read access to the normal file in the normal folder corresponding to the specified file path name to be executed via the kernel when the file does not exist.

10. The computer-readable medium having stored therein a program according to claim 7, wherein said rewriting the specified file path name comprises:
maintaining a list of exceptional files which can be output to the normal folder for each application program and setting in advance a path name of a configuration file specific to the application program as the exceptional file maintained in the list when the application program is operating as the process in the confidential mode; and
allowing file access to the configuration file corresponding to the exceptional file in the normal folder to be executed via the kernel based on the path name of the configuration file in the list when the confidential file is the exceptional file.

11. A computer-readable medium having stored therein a program for causing a computer to perform a method for switching a folder to be accessed based on a confidential mode, said computer executing a kernel and an application program as a process, said kernel having a file system for controlling file access of a disk device, said application program executing file access to the disk device via the file system, the process comprising a plurality of processes including a process in a confidential mode and a process in a normal mode, both of which are different in security level from each other, the computer maintaining security by restricting communication among the plurality of processes based on the security level, said method comprising:

setting a directory structure in the disk device such that:
a confidential root directory is located below a normal root directory;
at least one normal folder is located below the normal root directory with a directory structure and is configured to store a normal file comprising non-confidential information;
at least one confidential folder is located below the confidential root directory with a directory structure and is configured to store a confidential file comprising confidential information; and
a directory structure comprising the at least one confidential folder other than the confidential root directory is the same as that comprising the at least one normal folder other than the normal root directory;
specifying a security level expressing whether the application program should be operated as a process in a confidential mode capable of accessing the confidential file or as a process in a normal mode incapable of accessing the confidential file when the application program is started up by the computer;
determining whether the application program is operating as the process in the confidential mode or as the process in the normal mode based on the security level specified when a file access request for file access to the disk device with a specified file path name is received from the application program;

allowing file access to a confidential file in the confidential folder to be executed via the kernel when the application program is operating as a process in the confidential mode and the specified file path name is a file path name of the confidential folder below the confidential root directory; and not permitting file access to the confidential file in the confidential folder when the application program is operating as the process in the normal mode.

12. The computer-readable medium having stored therein a program according to claim 11, wherein said allowing file access to a confidential file comprises:

maintaining a list of exceptional files which can be output to the normal folder for each application program and setting in advance a path name of a configuration file specific to the application program as the exceptional file maintained in the list when the application program is operating as the process in the confidential mode; and allowing file access to the configuration file corresponding to the exceptional file in the normal folder to be executed via the kernel when a file denoted by the specified file path name corresponds to the exceptional file.

13. A computer system for switching a folder to be accessed based on a confidential mode, said computer system executing a kernel and an application program as a process, said kernel having a file system for controlling file access of a disk device, said application program executing file access to the disk device via the file system, the process comprising a plurality of processes including a process in a confidential mode and a process in a normal mode, both of which are different in security level from each other, the computer system maintaining security by restricting communication among the plurality of processes based on the security level, said computer system comprising:

means for setting a directory structure in the disk device such that:

a confidential root directory is located below a normal root directory;

at least one normal folder is located below the normal root directory with a directory structure and is configured to store a normal file comprising non-confidential information;

at least one confidential folder is located below the confidential root directory with a directory structure and is configured to store a confidential file comprising confidential information; and a directory structure comprising the at least one confidential folder other than the confidential root directory is the same as that comprising the at least one normal folder other than the normal root directory;

means for specifying a security level expressing whether the application program should be operated as a process in a confidential mode capable of accessing the confidential file or as a process in a normal mode incapable of accessing the confidential file when the application program is started up by the computer;

means for determining whether the application program is operating as the process in the confidential mode or as the process in the normal mode, based on the security level specified when a file access request for file access to the disk device with a specified file path name is received from the application program;

means for rewriting the specified file path name with a file path name of the confidential folder below the confidential root directory and allowing file access to the confidential file specified by the file path name to be executed via the kernel when the application program is operating as the process in the confidential mode; and means for not permitting the file access to the confidential file in the confidential folder when the application program is operating as the process in the normal mode.

14. The computer system according to claim 13, wherein said rewriting means comprises means for rewriting the specified file path name with a file path name of the confidential folder below the confidential root directory by adding the confidential root directory name to a head of the specified file path name when the application program is operating as the process in the confidential mode.

15. The computer system according to claim 13, wherein said rewriting means comprises:

means for determining whether the file access request is a write instruction;

means for allowing writing into the confidential file in the confidential folder to be executed through the kernel when the file access request is the write instruction;

means for determining whether a file corresponding to the file path name written by adding the confidential root directory name to a head of the specified file path name exists when the file access request is not the write instruction;

means for rewriting the specified file path name with the file path name corresponding to the confidential folder below the confidential root directory by adding the confidential root directory name to a head of the specified file path name, and allowing file access other than writing into the confidential file in the confidential folder specified by the file path name to be executed via the kernel when the file exists; and means for allowing read access to the normal file in the normal folder corresponding to the specified file path name to be executed via the kernel when the file does not exist.

16. The computer system according to claim 13, wherein said rewriting means comprises:

means for maintaining a list of exceptional files which can be output to the normal folder for each application program and setting in advance a path name of a configuration file specific to the application program as the exceptional file maintained in the list when the application program is operating as the process in the confidential mode; and means for allowing file access to the configuration file corresponding to the exceptional file in the normal folder to be executed via the kernel based on the path name of the configuration file in the list when the confidential file is the exceptional file.

17. A computer system for switching a folder to be accessed based on a confidential mode, said computer system executing a kernel and an application program as a process, said kernel having a file system for controlling file access of a disk device, said application program executing file access to the disk device via the file system, the process comprising a plurality of processes including a process in a confidential mode and a process in a normal mode, both of which are different in security level from each other, the computer system maintaining security by restricting communication among the plurality of processes based on the security level, said computer system comprising:

means for setting a directory structure in the disk device such that:

a confidential root directory is located below a normal root directory;

at least one normal folder is located below the normal root directory with a directory structure and is configured to store a normal file comprising non-confidential information;

at least one confidential folder is located below the confidential root directory with a directory structure and is configured to store a confidential file comprising confidential information; and a directory structure comprising the at least one confidential folder other than the confidential root directory is the same as that comprising the at least one normal folder other than the normal root directory;

means for specifying a security level expressing whether the application program should be operated as a process in a confidential mode capable of accessing the confidential file or as a process in a normal mode incapable of accessing the confidential file when the application program is started up by the computer;

means for determining whether the application program is operating as the process in the confidential mode or as the process in the normal mode, based on the security level specified when a file access request for file access to the disk device with a specified file path name is received from the application program;

means for allowing file access to a confidential file in the confidential folder to be executed via the kernel when the application program is operating as a process in the confidential mode and the specified file path name is a file path name of the confidential folder below the confidential root directory; and means for not permitting the file access to the confidential file in the confidential folder when the application program is operating as the process in the normal mode.

18. The computer system according to claim 17, wherein said allowing means comprises:

means for maintaining a list of exceptional files which can be output to the normal folder for each application program and setting in advance a path name of a configuration file specific to the application program as the exceptional file maintained in the list when the application program is operating as the process in the confidential mode; and means for allowing file access to the configuration file corresponding to the exceptional file in the normal folder to be executed via the kernel when a file denoted by the specified file path name corresponds to the exceptional file.

19. An access control method, comprising:

storing a confidential information file in a first computer readable area;

setting a file path indicating a second computer readable storage are a other than the first computer readable storage area as a file path of a file having a filename of the confidential information file on a file system;

detecting whether a process is a process which is allowed to access the confidential information when the process attempts to access the file having the filename;

notifying the file path indicating the second computer readable storage area when the process is not a process which is allowed to access the confidential information; and notifying a file path indicating the first computer readable storage area in which the confidential information file is stored when the process is a process which is allowed to access the confidential information.

20. The access control method according to claim 19, wherein the detecting whether a process is a process which is allowed to access the confidential information detects whether the process is a process which is allowed to access the confidential information when the process is staffed up.

21. The access control method according to claim 19, wherein the confidential information file and a file other than the confidential information file are grouped and stored in different storage areas respectively.

22. An access control system, comprising: means for storing a confidential information file in a first computer readable storage area;

means for setting a file path indicating a second computer readable storage area other than the first computer readable storage area as a file path of a file having a filename of the confidential information file on a file system;

means for detecting whether a process is a process which is allowed to access the confidential information when the process attempts to access the file having the filename;

means for notifying the file path indicating the second computer readable storage area when the process is not a process which is allowed to access the confidential information; and means for notifying a file path indicating the first computer readable storage area in which the confidential information file is stored when the process is a process which is allowed to access the confidential information.

23. The access control system according to claim 22, wherein the means for detecting detects whether the process is a process which is allowed to access the confidential information when the process is started up.

24. The access control system according to claim 22, wherein the confidential information file and a file other than the confidential information file are grouped and stored in different storage areas respectively.

25. A computer-readable medium having stored therein a program for causing a computer to perform a method for access control, said method comprising:

storing a confidential information file in a first storage area;

setting a file path indicating a second storage area other than the first storage area as a file path of a file having a filename of the confidential information file on a file system;

detecting whether a process is a process which is allowed to access the confidential information when the process attempts to access the file having the filename;

notifying the file path indicating the second storage area when the process is not a process which is allowed to access the confidential information; and notifying a file path indicating the first storage area in which the confidential information file is stored when the process is a process which is allowed to access the confidential information.

26. The computer-readable medium having stored therein a program according to claim 25, wherein the detecting whether a process is a process which is allowed to access the confidential information detects whether the process is a process which is allowed to access the confidential information when the process is started up.

27. The computer-readable medium having stored therein a program according to claim 25, wherein the confidential information file and a file other than the confidential information file are grouped and stored in different storage areas respectively.

* * * * *